United States Patent
Moriwaki et al.

(10) Patent No.: US 6,466,617 B1
(45) Date of Patent: *Oct. 15, 2002

(54) ADDITIONAL INFORMATION SIGNAL SUPERIMPOSING AND DETECTING SYSTEM, ADDITIONAL INFORMATION SUPERIMPOSING AND DETECTING METHOD, AND ADDITIONAL INFORMATION SIGNAL DETECTING METHOD AND APPARATUS THEREFOR

(75) Inventors: Hisayoshi Moriwaki; Takashi Kohashi, both of Tokyo; Yuji Kimura, Kanagawa; Akira Ogino; Nozomu Ikeda, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/702,203

(22) Filed: Oct. 31, 2000

Related U.S. Application Data

(62) Division of application No. 09/143,963, filed on Aug. 31, 1998, now Pat. No. 6,163,565.

(30) Foreign Application Priority Data

Sep. 1, 1997 (JP) .............................. 9-235789

(51) Int. Cl.$^7$ ................................ H04N 5/91
(52) U.S. Cl. ......................... 375/240; 386/94; 386/95; 386/106
(58) Field of Search ................ 375/295, 340, 375/240.18, 240.2; 386/194, 95, 109; 360/60; 380/203; 370/522, 527, 529

(56) References Cited

U.S. PATENT DOCUMENTS

| | | | |
|---|---|---|---|
| 5,216,712 A | | 6/1993 | Shimoda et al. ............... 380/4 |
| 5,535,275 A | * | 7/1996 | Sugisaki et al. .............. 380/10 |
| 5,621,840 A | | 4/1997 | Kawamura et al. ........... 386/68 |
| 5,687,191 A | | 11/1997 | Lee et al. .................... 375/216 |
| 5,915,027 A | | 6/1999 | Cox et al. ...................... 380/54 |
| 5,991,499 A | | 11/1999 | Yagasaki et al. .............. 386/94 |
| 6,023,551 A | * | 2/2000 | Sugita et al. ................. 386/94 |
| 6,058,243 A | * | 5/2000 | Ogino et al. .................. 386/94 |
| 6,069,665 A | * | 5/2000 | Ikeda et al. ................. 348/478 |
| 6,163,565 A | * | 12/2000 | Moriwaki et al. .......... 375/141 |
| 6,226,445 B1 | * | 5/2001 | Abe ............................. 386/94 |

* cited by examiner

*Primary Examiner*—Amanda T. Le
(74) *Attorney, Agent, or Firm*—Jay H. Maioli

(57) ABSTRACT

Video signals are converted into one or more blocks for each predetermined unit amount of data, and a Discrete Cosine Transform (DCT) process is performed in the blocks a convert the video signal from a time-base area signal to a DCT coefficient in a frequency area for data compression. One chip of a spread spectrum signal is allocated to each block of the video signal or to each of a plurality of blocks, and additional information is superimposed on the video signal at a constant level corresponding to the chip value for transmission. A video signal on which the additional information consisting of the spread spectrum signal transmitted has been superimposed is received, and from this received signal, a DC component of the DCT coefficient is extracted. Inverse spread spectrum processing is performed for the DC component of the DCT coefficient extracted to detect the additional information.

4 Claims, 9 Drawing Sheets

FIG. 1A
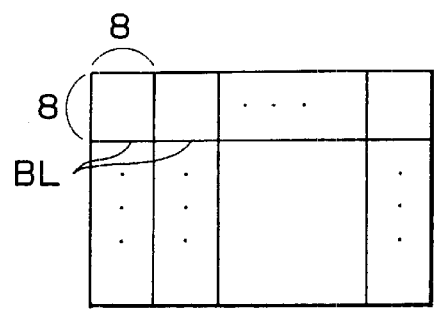
FIG. 1B
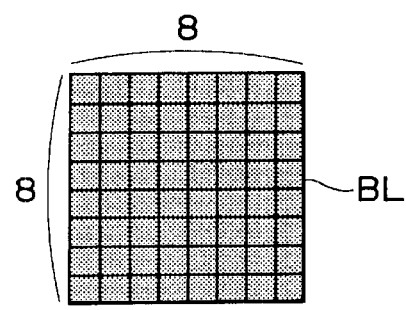
DCT PROCESS
FIG. 1C
|  | AC1 | AC5 | AC6 |  |  |  |  |
|---|---|---|---|---|---|---|---|
| AC2 | AC4 |  |  |  |  |  |  |
| AC3 |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

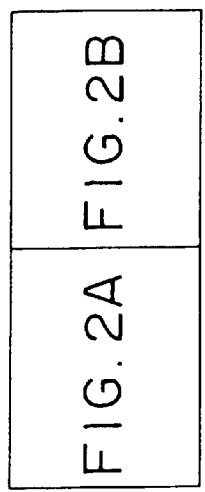
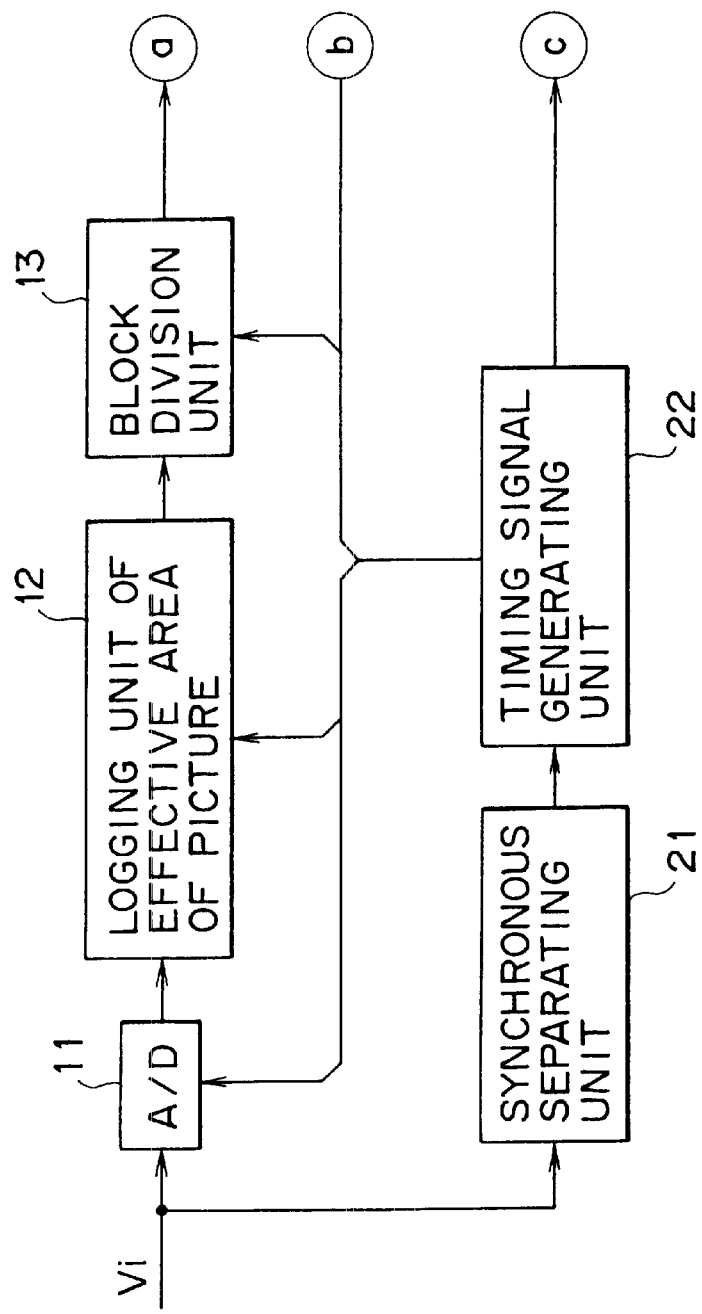
FIG. 2A

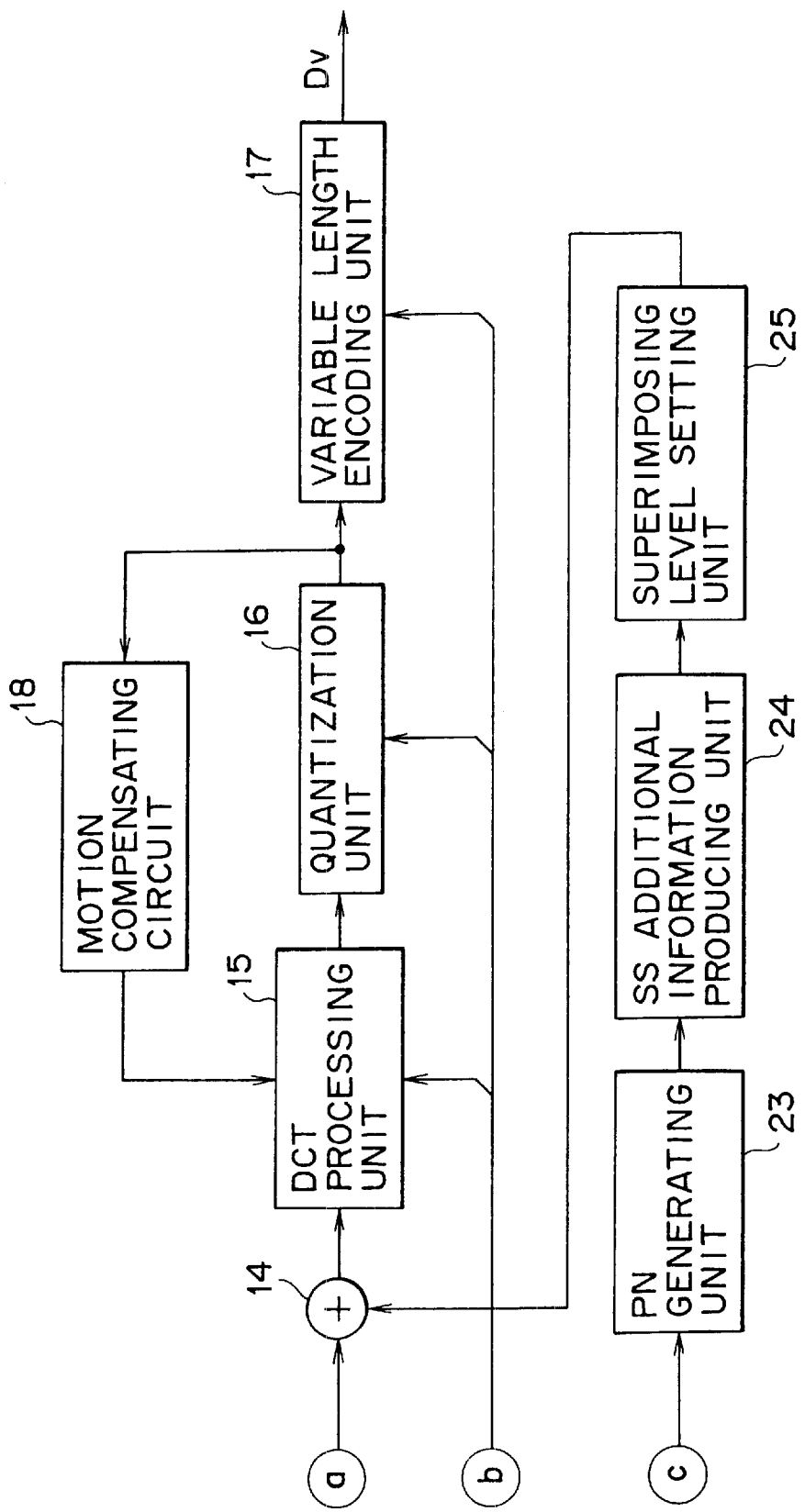

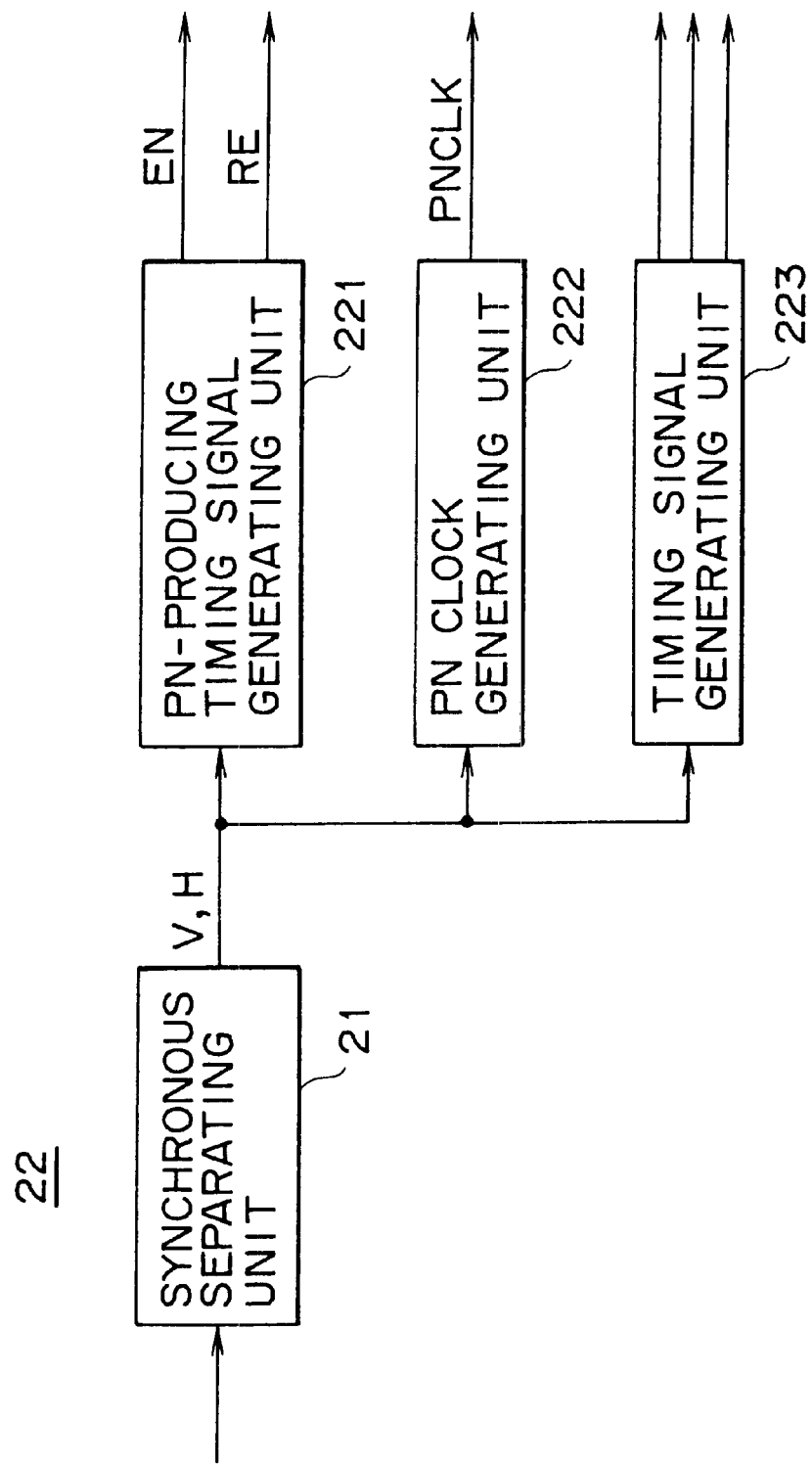

DUPLICATION-PREVENTIVE CONTROL SIGNAL
SPECTRUM BEFORE SPREAD SPECTRUM

DUPLICATION-PREVENTIVE CONTROL SIGNAL
SPECTRUM AFTER SPREAD SPECTRUM

INFORMATION SIGNAL SPECTRUM ON WHICH
A SS DUPLICATION-PREVENTIVE CONTROL
SIGNAL IS SUPERIMPOSED

SIGNAL SPECTRUM AFTER INVERSE SPREAD
SPECTRUM AT A RECORDING DEVICE

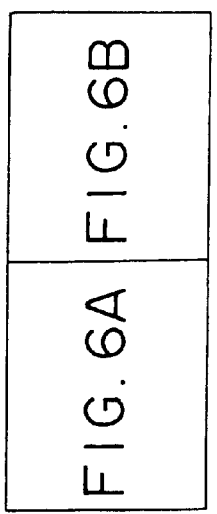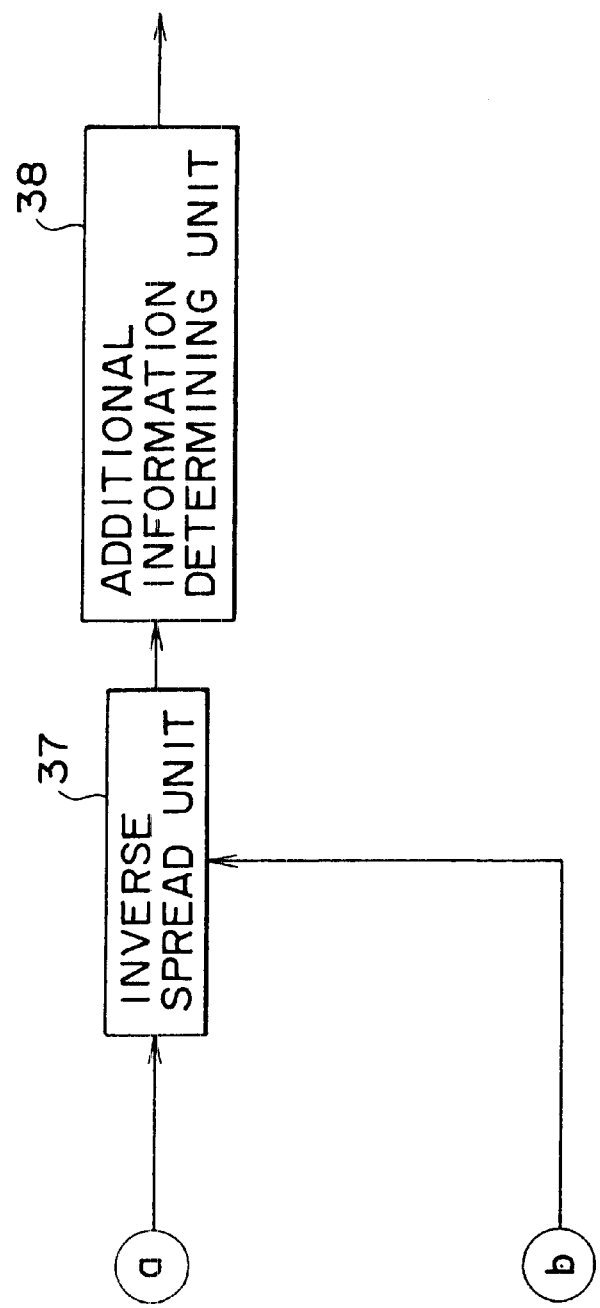

ADDITIONAL INFORMATION SIGNAL SUPERIMPOSING AND DETECTING SYSTEM, ADDITIONAL INFORMATION SUPERIMPOSING AND DETECTING METHOD, AND ADDITIONAL INFORMATION SIGNAL DETECTING METHOD AND APPARATUS THEREFOR

This is a division of the prior application Ser. No. 09/143,963 filed Aug. 31, 1998 U.S. Pat. No. 6,163,565.

FIELD OF THE INVENTION

The present invention relates to a method, an apparatus, and a system for superimposing and transmitting additional information, by spectrum spreading additional information compressed using a DCT (Discrete Cosine Transform) process, on, for example, a video signal so as not to affect its reproduced image as far as possible, and superimposing on an infinitesimal level for transmitting it, and detecting the additional information from the received signal on the receiving side for utilization, and an apparatus for detecting the superimposed additional information.

BACKGROUND OF THE INVENTION

Digital information recording apparatuses such as digital VTRs and MD (Minidisc) recording and reproducing apparatuses have become widespread, and further DVD (Digital Video Disc or Digital Versatile Disc) apparatuses each equipped with a recording function have also come on the market. In these digital information recording apparatuses, various additional information signals are allowed to be recorded in the wake of digital video signals, digital audio signals and further data for computers and the like, which are main information signals.

In this case, this additional information signal is a digital signal, and is added to a digital information signal as a signal to be recorded in such an area as is regionally distinguished from the digital information signal, such as a header portion to be added to data of, for example, a digital information signal in units of blocks, and an area for other TOC (Table of Contents).

As described above, in the case of a system of transmitting by superimposing additional information on a conventional main information signal for recording among others, the additional information signal is not directly superimposed on a digital information signal such as a header portion, but is arranged to be added to an indirect portion. For this reason, the additional information signal is comparatively easily removed by filtering or tampering, thus possibly making it impossible to detect a necessary additional information signal by a recording apparatus or a reproducing apparatus. Particularly, if control information to prevent unauthorized duplication, copyright information or the like is added as an additional information signal, the removal of such an additional information signal will bring about such a state that the initial object cannot be achieved.

Also, in the case of addition of an additional information signal to such an indirect portion as described above, the additional information signal will be lost when the digital information signal is converted into an analog signal because only the main information signal can be obtained. This means that even if such a measure as to prevent unauthorized duplication of a digital information signal is taken by superimposing such a duplication-preventive control signal as described above as an additional information signal, such a situation that the duplication-preventive measure counts for nothing any longer will develop when converted into an analog signal.

As a superimposition system for an additional information signal capable of solving the problem on the lost additional information signal and the problem when the additional information signal is converted into an analog signal as described above, the present applicant previously proposed a system for spectrum spreading an additional information signal such as the duplication-preventive control signal, and superimposing this additional information signal thus spectrum spread on a video signal to digital-record or analog-record the video signal (U.S. patent application Ser. No. 08/75510).

In this system, a code (hereinafter, referred to as PN code) of, for example, PN (Pseudorandom Noise) series, which is used as a spread code, is caused to be generated at a sufficiently early period, and this code is spectrum spread by applying it to the additional information signal, whereby an additional information signal such as a duplication-preventive control signal of a narrow band on a high level is caused to be converted into a signal of a wide band on an infinitesimal level which does not affect the video signal. is, this additional information signal thus spectrum spread, that is, the spread spectrum signal is superimposed on the analog video signal to record on a recording medium. In this case, a video signal to be recorded on the recording medium may be either analog or digital.

In this system, the additional information signal such as the duplication-preventive control signal is superimposed at the same time and within the same frequency as the video signal, and therefore, it is difficult, for, for example, a person who intends to duplicate illegally to remove the duplication-preventive control signal superimposed from the video signal. On the other hand, it is possible to utilize by detecting an additional information signal such as the duplication-preventive control signal superimposed by inverse spread spectrum.

Since the additional information superimposed on the video signal is not removed from the video signal when the video signal is reproduced, it is necessary as described above to superimpose the additional information on the video signal on an infinitesimal level which does not affect the reproduced image of the video signal. However, the infinitesimal level must be a level on which the additional information can be detected.

As described above, it is possible to reliably supply the duplication-preventive control signal together with the video signal to a recording apparatus side, and on the side of this recording apparatus, it is also possible to detect this duplication-preventive control signal for reliably performing duplication control corresponding to the duplication-preventive control signal detected.

In the case of recording the video signal particularly as a digital signal, the video signal is converted into one or more blocks in units of plural pixels to be subjected to a compression process in the block unit. As this compression technique, the MPEG2 system or the like is generally used. In this MPEG2, the video signal is converted from a time-base area signal to a DCT coefficient in a frequency area and is compressed by means of the DCT process in block unit. On the reproduction side, the inverse DCT process is performed so that the data of the DCT coefficient is returned to the digital video signal in the time-base area.

It is, of course, possible to superimpose an additional information spectrum spread as described above also on the video signal transmitted accompanied by such data compression. As regards the additional information superimposed, it is generally considered to detect after returned from the DCT coefficient to the time-base area signal.

However, in a case where the additional information cannot be detected unless it is returned to the time-base area signal in advance as described above, there arises inconvenience that it becomes possible to duplicate digital information at a stage of DCT coefficient in a compressed bit stream state even if the additional information in question is, for example, information for duplication-preventive control and the content of the information is prohibited duplication.

In the light of the above-described points, it is an object of the present invention to provide a method and an apparatus capable of reliably detecting additional information superimposed even if an information signal compressed using DCT is not returned to the time-base area signal.

SUMMARY OF THE INVENTION

The present invention concerns an information outputting apparatus for outputting an information signal with additional information by superimposing additional information on an information signal, and an additional information superimposing and detecting system for receiving the information signal with additional information from the information outputting apparatus to detect the additional information from the information signal. The information outputting apparatus is characterized by comprising: first spread code generating means for generating a first spread signal having chip sections corresponding to each block comprising information signals divided for each data of a predetermined amount; spectrum spreading means for spectrum spreading the additional information signal through the first spread code to generate a spread additional information signal; signal superimposing means for superimposing the spread additional information signal on the information signal to generate an information signal with additional information; compressing means for discrete cosine transforming the information signal with additional information for each of the blocks to thereby convert the information signal with additional information from a time-base area signal to a DCT coefficient in a frequency area, and data compressing the information signal with additional information to generate a compressed information signal; signal extracting means for extracting a DC component of the DCT coefficient from the compressed information signal; second spread code generating means for generating the same second spread signal as the first spread signal on the basis of the information signal with additional information; and inverse spectrum spreading means for inverse spectrum spreading the DC component of the DCT coefficient extracted by using the second spread code to detect the additional information signal from the compressed information signal.

According to the present invention, the additional information spectrum spread will be included in the DC component of the DCT coefficient when it is discrete cosine transformed. Therefore, on the side of detection of the additional information, it becomes possible to extract the DCT coefficient, and to detect the additional information from the DC component of the DCT coefficient thus extracted by means of the inverse spread.

BRIEF DESCRIPTION OF THE DRAWINGS

FIGS. 1A to 1C are explanatory diagrams mainly illustrating an embodiment of an additional information superimposing method according to the present invention;

FIG. 2 is a block diagram showing an example of an apparatus on an additional information superimposition side to which an embodiment of the additional information superimposing and transmitting method according to the present invention is applied;

FIG. 3 is a view showing a structural example for a part of the apparatus of FIG. 1;

DETAILED DESCRIPTION OF PREFERRED EMBODIMENT

Figure 4:
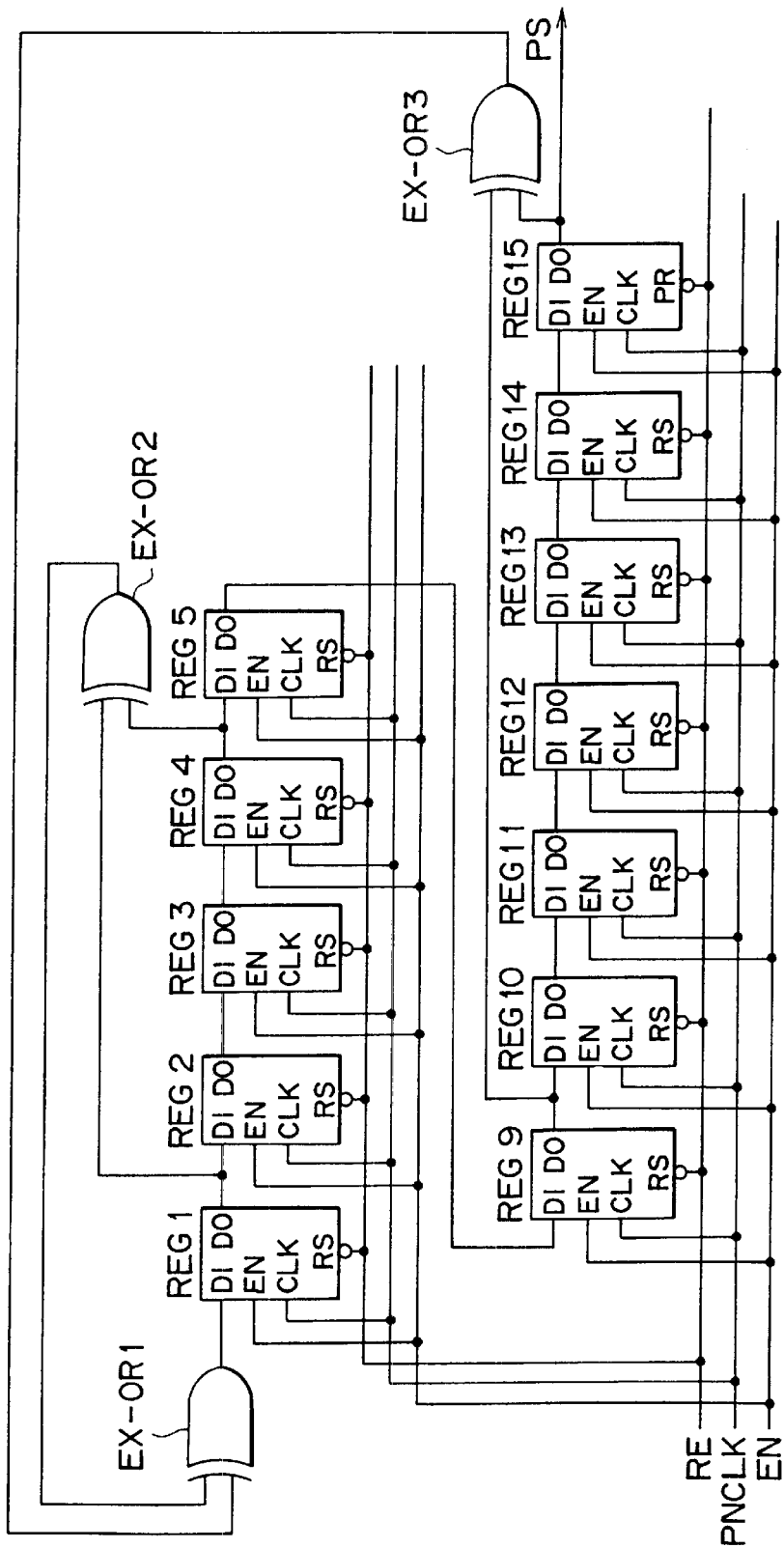
FIG. 4 is a view showing a structural example for a part of the apparatus of FIG. 1.

Hereinafter, with reference to the accompanying drawings, the description will be made of an embodiment according to the present invention. The embodiment to be described below is a case where a video signal is digital compressed by a compression system using DCT such as MPEG2 system and the compressed video signal is transmitted through a network or is transmitted by a method such as a method of recording on a recording medium.

In this embodiment, one screen of one frame (or one field) of a video signal is divided into blocks BL for each rectangular region consisting of, for example, horizontal direction×vertical direction=8 pixels×8 pixels as shown in FIG. 1A, and the video signal is subjected to DCT process in units of the BL for compression. Thus, the additional information is superimposed on the video signal in such manner that 1 chip of spread code is allocated to 1 block BL as a spread spectrum signal.

Also in this embodiment, when the value of 1 chip of a spread spectrum signal is "0" with respect to a video signal, a positive constant level is superimposed, and when "1", the spread spectrum signal is as additional information is superimposed on a video signal as a negative constant level. The level superimposed as 1 chip is made to be an infinitesimal level on which the influence of the video signal on the reproduced image is restricted to a minimum.

In this respect, this embodiment is to superimpose a duplication-preventive control signal as additional information, and a case where design is made such that duplication-preventive control on a digital video signal transmitted can be performed. This duplication-preventive control signal may have the content of limited generation such as, for example, that only the duplication of the first generation is permitted, and may be a signal indicating prohibited or approved duplication of a video signal. It is constituted by 1 bit or several bits.

Also, in the following embodiment, a spread spectrum signal is superimposed on a luminance signal Y of video signals, and is not superimposed on a color signal C. It is of course possible to superimpose the spread spectrum signal also on a color signal C. Since, however, on transmitting a color signal in the video signal, two phase axis components of, for example, color-difference signals or the like are used to reproduce the color through the phases of these two axes, the hue is changed even on an infinitesimal level, when the spread spectrum signal is superimposed on the color signal.

Therefore, the color becomes comparatively conspicuous, and it is difficult to superimpose the spread spectrum signal without affecting the change in hue. For this reason, in this embodiment, the spread spectrum signal shall be superimposed only on the luminance signal. For the sake of brevity of description, however, an expression of "video signal" will be used without discriminating the luminance signal Y from the color signal C in the following description.

FIG. 2 is a block diagram showing an example of an additional information superimposing apparatus according to this embodiment.

An analog video signal Vi inputted is converted into a digital signal by an A-D converter 11, is supplied to a logging unit of effective area of picture 12, and is supplied to a block division unit 13 after a synchronizing signal portion is removed.

In the block division unit 13, the digital video signal is, as shown in FIG. 1A, divided into units of block BL of horizontal direction×vertical direction=8 pixels×8 pixels. Data in units of block from this block division unit 13 are supplied to an additional information superimposing unit 14. Thus, as described later, additional information consisting of spread spectrum signals is supplied to this superimposing unit 14, and is superimposed so that 1 chip of the spread spectrum signal is just allocated to the data in units of block.

The digital video signal on which additional information from the superimposing unit 14 is superimposed is supplied to a DCT processing unit 15. In this DCT processing unit 15, the data in units of block BL are subjected to a DCT operation process for transforming a time-base area signal into a DCT coefficient in the frequency area (See FIGS. 1B and 1C).

The arithmetic processing result from the DCT processing unit 15 is supplied to the quantization unit 16 to be quantized. The output from the quantization unit 16 is supplied to the DCT processing unit 15 through a motion compensating circuit 18 to perform a DCT operation for the motion component. Namely, in an intraframe, which is called I picture, the DCT arithmetic process is performed within the frame, but in an inter-frame such as B picture and P picture, a difference between frames before and behind it is taken, and the difference is transmitted as the data. In order to make the difference as small as possible, a motion vector between the frames is detected to transmit also the motion component.

The output from the quantization unit 16 is variable length encoded using a Huffman code in a variable length encoding unit 17, and it is outputted as an output signal Dv for transmission for, for example, recording and the like.

Additional information is produced and superimposed as below. That is, an input analog video signal Vi is supplied to a synchronous separating unit 21. This synchronous separating unit 21 separates a horizontal synchronizing signal H and a vertical synchronizing signal V from the analog video signal Vi, and the horizontal synchronizing signal H and the vertical synchronizing signal V, which have thus been separated, are supplied to a timing signal generating unit 22.

The timing signal generating unit 22 uses the horizontal synchronizing signal H and the vertical synchronizing signal V as a reference signal, and digitizes the video signal to generate a timing signal for compression process. The timing signal generating unit 22 also produces, as described later, a PN-producing enabled signal EN showing a section for generating a PN code as a spread code for producing a spread spectrum signal, a PN code reset timing signal RE (hereinafter, abbreviated to reset signal RE) showing generation starting timing for the PN code, or a PN clock signal PNCLK.

FIG. 3 is a block diagram for explaining the timing signal generating unit 22 according to this embodiment. As shown in FIG. 3, the timing signal generating unit 22 of this embodiment comprises a PN-producing timing signal generating unit 221, a PN clock generating unit 222 consisting of PLL, and a timing signal generating unit 223 so that a horizontal synchronizing signal H and a vertical synchronizing signal V from the synchronous separating unit 18 are supplied to the PN-producing timing signal generating unit 221 and the timing signal generating unit 223, and that a horizontal synchronizing signal H from the synchronous separating unit 18 is supplied to the PN clock generating unit 222.

The PN-producing timing signal generating unit 221 uses the vertical synchronizing signal V as a reference signal to generate a reset signal RE of a vertical period for determining a cycle period of PN code sequence for spread which is used for spread spectrum. The PN-producing timing signal generating unit 221 also generates a PN-producing enabled signal EN.

The PN clock generating unit 222 synchronizes with the horizontal synchronizing signal H and generates the PN clock PNCLK with a block period using the PLL circuit. More specifically, the PN clock PNCLK is a clock signal of a period for each data for 1 block BL, or in this example, a period of 8×8=64 pixels. This PN clock PNCLK is used to determine a chip period of spread code.

Also, the timing signal generating unit 223 generates various timing signals which are used for digitizing video signals and for the compression process in the apparatus shown in FIG. 2 as described above on the basis of the vertical synchronizing signal V and the horizontal synchronizing signal H. A timing signal from the timing signal generating unit 223 contains a clock in units of pixels.

The PN-producing enabled signal EN, the reset signal RE and the PN clock PNCLK from the timing signal generating unit 22 are supplied to the PN generating unit 23.

The PN generating unit 23 generates a PN code in response to the clock signal PNCLK, the enabled signal EN and the reset signal RE. More specifically, the PN generating unit 23 generates through the reset signal RE, or in this example, is reset through a vertical period to generate a PN code sequence PS of a predetermined code pattern from its head. The PN generating unit 23 generates a PN code sequence PS in response to the clock signal PNCLK only when it is caused to be in a PN code enabled state through the enabled signal EN.

FIG. 4 is a view showing a structural example of the PN generating unit 23. The PN generating unit 23 of this example consists of 15 pieces of D flip-flops REG1 to REG15 which constitute a 15-stage shift register, and exclusive OR circuits EX-OR1 to EX-OR3 for operating an appropriate tap output of this shift register. The PN generating unit 23 shown in FIG. 4 generates, as described above, a PN code sequence PS of M-series on the basis of the enabled signal EN, the PN clock signal PNCLK and the PN code reset timing signal RE.

The PN code sequence PS thus obtained from the PN generating unit 23 is supplied to a SS (In this specification, SS is an abbreviation for spread spectrum. The same applies hereinafter) additional information producing unit 24. The SS additional information producing unit 24 comprises a multiplication unit for multiplying the above-described duplication-preventive control signal by the PN code sequence PS from the PN generating unit 23 for performing spread spectrum, and generates a SS duplication-preventive control signal as SS additional information. In this case, the duplication-preventive control signal which is supplied to the SS additional information producing unit 24 or is generated by this producing unit 24 is adapted to have the same information bit content at least in each block BL.

Thus, the SS additional information producing unit 24 supplies the SS duplication-preventive control signal produced to the superimposing unit 14 through the superimposing level setting unit 25.

In this case, the superimposing level setting unit 25 outputs a positive, constant infinitesimal level when the value of a chip of the SS duplication-preventive control signal is "0", or a negative, constant infinitesimal level when it is "1", which is a digital level corresponding to the value of the chip of the SS duplication-preventive control signal. In other words, as shown by cross-hatching in FIG. 1B, signals corresponding to the chip values are to be uniformly superimposed on all pixels within 1 block BL.

Accordingly, when a signal from the superimposing unit 14 has been subjected to the DCT process, all the additional information components of the spread spectrum signal superimposed are to be concentrated on coefficient DC which is the DC component of the DCT coefficient as shown in FIG. 1C.

As regards the SS duplication-preventive control signal superimposed as additional information, as described later, it becomes possible to detect it from the video signal by taking out the DC portion of the DCT coefficient, that is, only the coefficient DC and performing the inverse spread spectrum in a state of data of DCT coefficient before the inverse DCT process.

In video data thus transmitted, since the SS duplication-preventive control signal is contained in the coefficient DC during an inverse DCT operation when decoding has been made, this SS duplication-preventive control signal is superimposed on the video signal substantially without deterioration to be returned to its original state. In the case of components of high frequency, it may disappear owing to the compression, but the coefficient DC, which is a DC component, is surely contained in the compressed signal. Therefore, the SS duplication-preventive control signal is reliably transmitted and duplication control is performed reliably.

Figure 5A:
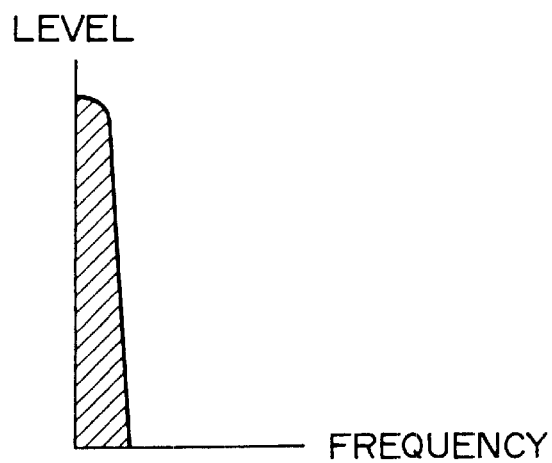
FIGS. 5A to 5D are explanatory graph illustrating relationship between an information signal and superimposition level of a spread spectrum signal.
Figure 5B:
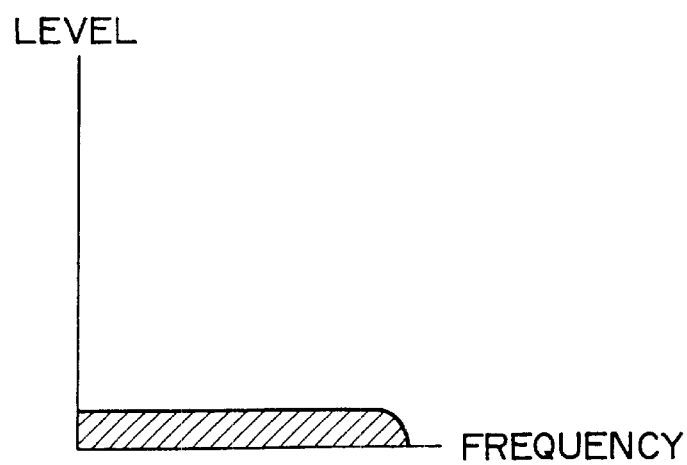

FIGS. 5A to 5D show relationship between the spread spectrum signal superimposed on an infinitesimal level as described above and the video signal in spectrum. The additional information signal spectrum spread has a small amount of information contained therein, is a signal of low bit rate, and is a narrow-band signal as shown in FIG. 5A. When this signal is subjected to spread spectrum, it becomes such a wide-band width signal as shown in FIG. 5B. At this time, the spread spectrum signal level becomes smaller in inverse proportion to the enlargement ratio of the band width.

Figure 5C:
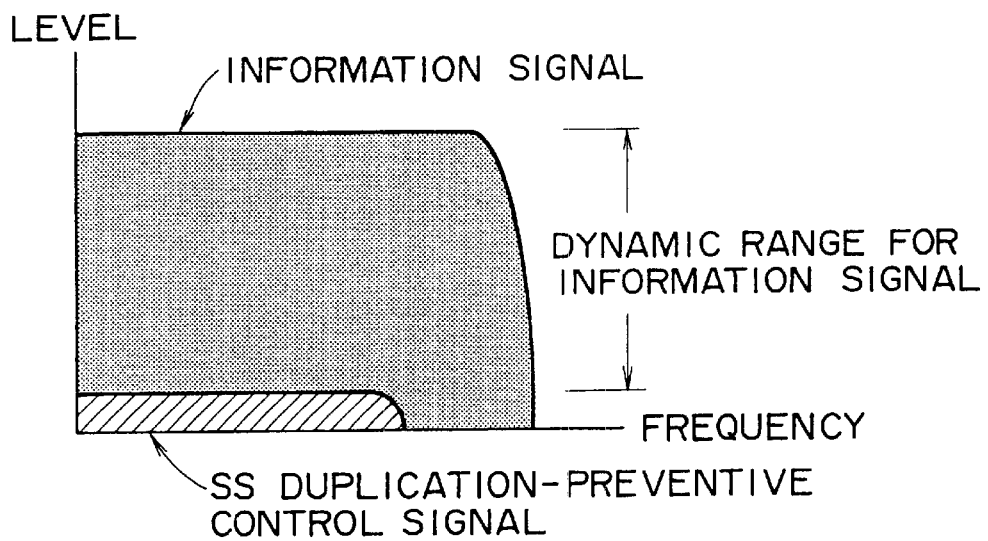

This spread spectrum signal is superimposed on a video signal by the superimposing unit 14. In this case, the spread spectrum signal is caused to be superimposed on a lower level than the dynamic range of information signal such as video signals as shown in FIG. 5C. By superimposing in this way, it is possible to almost prevent information signals such as video signals from being deteriorated. Accordingly, when a video signal on which a spread spectrum signal is superimposed is supplied to a monitor to reproduce the image, an excellent reproduced image can be obtained with almost no influence by the spread spectrum signal.

Figure 5D:
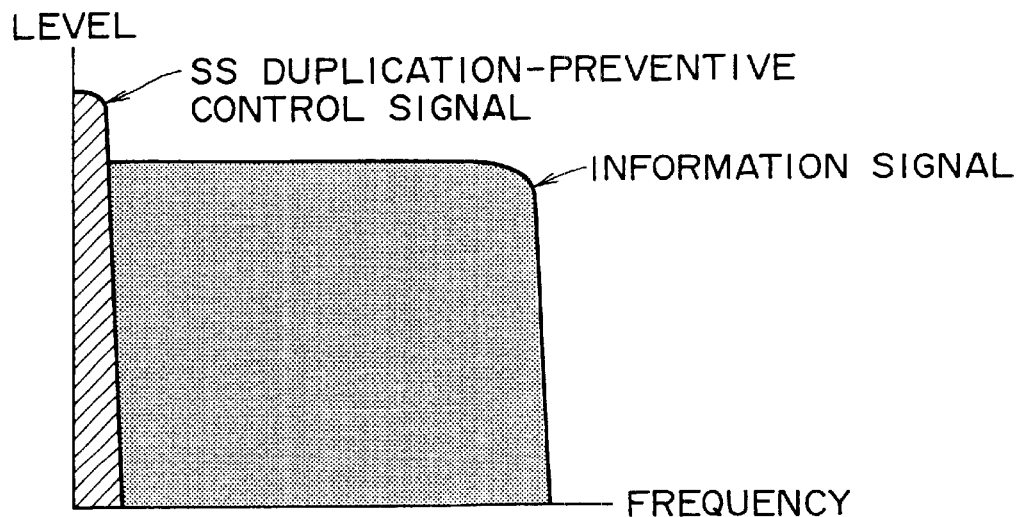

As described later, however, when the inverse spread spectrum is performed in order to detect the spread spectrum signal superimposed, the spread spectrum signal is restored as a narrow-band signal again as shown in FIG. 5D. By providing a sufficient bandwidth spread rate, the electric power of additional information signal after the inverse spread exceeds the information signal to enable detection.

In this case, since the additional information signal superimposed on an information signal such as video signals is superimposed at the same time and within the same frequency as the information signal such as video signals, it is impossible to delete and amend by replacing with a frequency filter or simple information.

Therefore, by superimposing a necessary additional information signal on a video signal or the like for recording, it is possible to reliably transmit such an additional information signal as the above-described duplication-preventive control signal in the wake of the video signal or the like. Moreover, in case where an additional information signal which has been spectrum spread at lower signal power than information signals such as video signals is superimposed on an information signal as in the case of the above-described embodiment, it is possible to minimize the degradation of the information signal.

When, for example, a duplication-preventive signal is superimposed on a video signal as an additional information signal, it is difficult as described above to tamper or delete the duplication preventing signal, and therefore, duplication-preventive control capable of reliably preventing unauthorized duplication becomes possible.

Since in the above-described structure, spread spectrum is performed using a PN code sequence of vertical period with a vertical synchronizing signal as a reference signal, a PN code sequence for inverse spread spectrum which becomes necessary in the case of detecting this spread spectrum signal from video signals can be easily produced on the basis of a signal synchronized with the vertical synchronizing signal detected from the video signal. In other words, synchronous control of the PN code for inverse spread using, for example, a sliding correlating apparatus or the like becomes unnecessary. Since a PN code sequence for inverse spread can be thus easily generated, the inverse spread spectrum is carried out quickly, and, spread spectrum is carried out quickly, and it is possible to detect an additional information signal such as a duplication-preventive control signal on which is superimposed on a video signal spread spectrum.

In this respect, in the example of FIGS. 1A to 1C, the SS duplication-preventive control signal has been arranged to be superimposed on a digital video signal, but it is also, of course, possible to superimpose on an analog video signal before A-D conversion in such a manner that 1 chip of the spread spectrum signal corresponds to plural pixels corresponding to data in units of block BL.

Figure 6A:
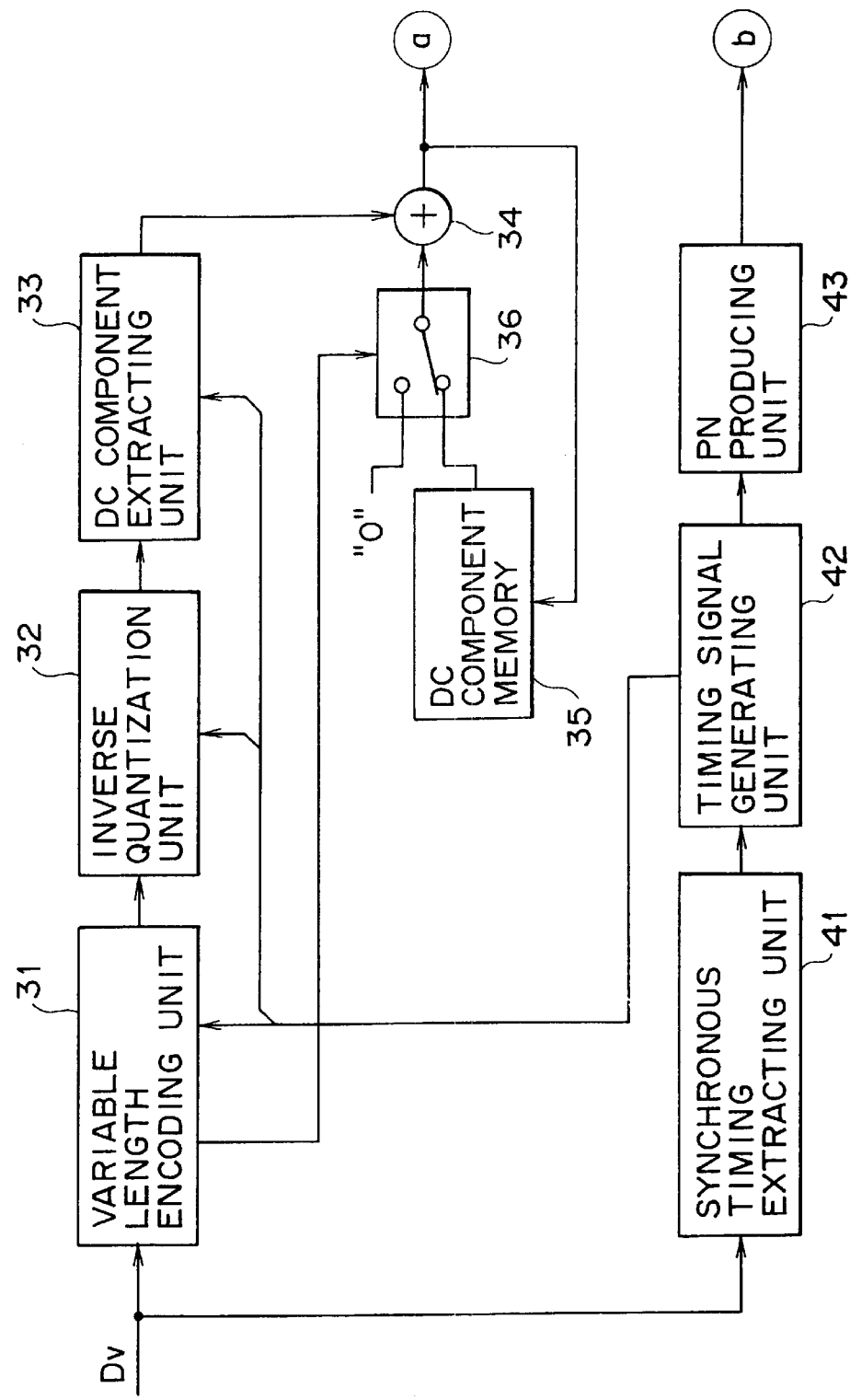
FIG. 6 is a block diagram showing an example of an apparatus on an additional information detection side to which an embodiment of the additional information superimposing and transmitting method according to the present invention is applied.

FIG. 6 shows an embodiment of an apparatus for detecting a duplication-preventive control signal, which is additional information, from compressed video signal data on which SS additional information is superimposed as described above.

More specifically, compressed video signal data Dv is supplied to a variable length encoding unit 31 to be encoded, and is supplied to an inverse quantization unit 32. In this inverse quantization unit 32, the data is inverse quantized to thereby be returned to data of bit stream consisting of DCT coefficient. The data from this inverse quantization unit 32 is supplied to a DC component extracting unit 33 to extract the coefficient DC which is the DC component of the DCT coefficient.

This coefficient DC is supplied to an adder 34 for extracting correct data by integrating a difference in the interframe. An output signal from this adder 34 is temporarily stored in a DC component memory 35. The DC component memory 35 has a storage area for 1 frame in units of block, and the storage area in each block unit is updated by a new output from a corresponding block from the adder 34. The DC component output for each block from this DC component memory 35 is supplied to one input end of a switching circuit 36. Also, "0" is supplied as a DC component to the other input end of the switching circuit 36.

This switching circuit 36 is switching-controlled for each frame in response to information as to whether it is an intraframe contained in the header information in input digital compressed data in the variable length encoding unit 31 or an interframe. More specifically, when the data being decompressed is of the intraframe, namely in the I picture, the switching circuit 36 is switched to "0" side. This is because the data of each block BL at this time is data which is completed within the frame, and is data within the frame in question, which is not a difference between frames before and behind it.

On the other hand, when the data being decompressed is of interframe data, the switching circuit 36 is switched to the DC component memory 35 side, the difference for each block is accumulated in the memory 35, the difference is added to the data in the next frame, and correct data is restored.

As described above, the DC component of the DCT coefficient restored is supplied to the inverse spread unit 37. On the other hand, a PN code sequence which synchronizes with the PN code on the superimposition side is supplied to this inverse spread unit 37, and the inverse spread is performed to detect the additional information superimposed on the DC component of the DCT coefficient. The additional information thus detected is supplied to an additional information determining unit 38 to determine the bit of the additional information.

The PN code sequence for inverse spread is generated in synchronization with the superimposition side as below. More specifically, the compressed video signal data Dv is supplied to a synchronous timing extracting unit 41 to generate a synchronous timing signal. This synchronous timing signal contains a block synchronous timing signal, and a synchronous timing signal for data in units of frame. The synchronous timing signal from this synchronous timing extracting unit 41 is supplied to a timing signal generating unit 42, where a timing signal such as clock used for decompressing and a timing signal for generating a spread code for inverse spread are produced.

A spread code for inverse spread is generated from a PN producing unit 43. This PN producing unit 43 has quite the same structure as the PN producing unit shown in FIG. 4 described above. A timing signal generating unit 42 generates a reset signal RE, an enabled signal EN and a clock signal PNCLK which synchronize with the timing signal used on the superimposition side of the SS additional information on the basis of a synchronizing timing signal from the synchronous timing extracting unit 41, and supplies those signals to the PN producing unit 43.

Accordingly, a PN code sequence, which synchronizes with the PN code sequence on the superimposition side, is generated from the PN producing unit 43. Through the PN code sequence from this PN producing unit 43, the additional information is detected from the output signal from the adder 34 in the inverse spread unit 37.

Through a duplication-preventive control signal as additional information which has been detected and determined as described above, in this embodiment, it is possible to detect whether or not digital compressed video data in bit stream stage can be duplicated. If it is, for example, duplication prohibited, it is possible to dispose of the bit stream data captured in the buffer without reading it out.

If what is needed is only to detect additional information such as a duplication-preventive control signal, the inverse DCT processing unit is not required, and therefore, there are the merits that the structure as the additional information detecting apparatus is simplified and becomes low-priced.

For example, a DVD playback apparatus or a DVD recording and playback apparatus has a MPEG decoder for returning a video signal compressed by MPEG2 to a time-base area signal, and therefore, it is of course possible to return the video signal compressed to a video signal of the time-base area by means of the inverse DCT process, and thereafter to detect the additional information by means of the inverse spread.

In the case of a DVD-ROM driver, however, no MPEG decoder is provided, but MPEG decoding is performed in a personal computer or the like connected to this DVD-ROM driver. In this case, if unauthorized duplication can be prevented before the MPEG decoding, effective duplication-preventive control will be possible.

If the DVD-ROM driver is provided with the additional information detecting apparatus of FIG. 6 described above, it will become possible to perform a control process such as duplication prevention for bit stream data at a stage before it is installed in a personal computer, at comparatively low price even if such an expensive apparatus as the MPEG decoder is not used.

Also, even if the apparatus of FIG. 6 is connected like an adapter between the DVD-ROM driver or the like and a personal computer or the like, the same operation effect can be obtained.

In the above description, the structure has been arranged such that spread spectrum is performed by a PN code sequence of vertical period and an adder 34 and a DC component memory 35 are provided in consideration of a difference in the interframe, but the PN code sequence of vertical period is caused to be reversed with a frame period corresponding to one difference, and the additional information is spectrum spread for superimposition, whereby the adder 34 and the DC component memory 35 can be omitted.

In the above description, the SS additional information has been superimposed on the video signal in such a manner that one chip corresponds to one block, but it may be possible to allocate one chip for each of a plurality of blocks exceeding one block, and to superimpose so that, for example, a macro block having four blocks corresponds to one chip.

Also, it may be also possible to superimpose by allocating one chip for each block consisting of a plurality of pixels in one direction: horizontal direction or vertical direction, or for each of a plurality of blocks, instead of a block consisting of a plurality of pixels in both directions: horizontal and vertical directions.

Also, the reset period for spread code for spread spectrum may be plural vertical periods and not one vertical period. Further, the reset period for spread code may be one horizontal period or plural horizontal periods.

Also, in the above-described example, the structure has been arranged such that the superimposing level is set to positive or negative in response to whether the chip of spread code is "0" or "1", but it may be possible to superimpose with one on "0" level and the other on a positive or negative level, and in this case, the positive or negative level is made to be a superimposing level pattern of such a fixed pattern as described above, whereby the present invention is applicable.

Also, in the above description, the additional information signal which is spectrum spread and superimposed, has been a duplication-preventive control signal, but this additional information signal is not limited to such a duplication-preventive control signal, but information relating to, for example, digital video signals, time code information, copyright information and the like for distinguishing, for example, each field can be used. As the copyright information, an apparatus number for specifying, for example, the recording apparatus in question can be used. If this apparatus number has been superimposed on the digital video signal Vi and recorded, a history duplicated can be easily followed up.

Also, in the above description, a case where a spread spectrum signal is superimposed on an analog video signal has been described, but it is of course possible to superimpose a spread spectrum signal on a digital video signal, and in this case, it goes without saying that the present invention is applicable.

Also, in the above description, the additional information bit has been spectrum spread through the PN code, but the present invention is of course applicable to a case where a spread spectrum signal is detected by superimposing PN codes of different series in response to the additional information bit and detecting those PN codes.

Also, for example, when assuming that when the PN code is superimposed, "1", or when not superimposed, "0" is transmitted respectively, the PN code itself is superimposed on the video signal as a spread spectrum signal, the present invention is applicable.

Also, the spread code is not limited to the PN code, but it goes without saying that other codes such as gold code can be used.

Also, in the above description, the description has been made of the case in which it is applied to a recording and playback system, but the present invention is also applicable when additional information is superimposed on a video signal for transmission through various transmission media such as radio waves, cable and infrared ray.

What is claimed is:

1. An apparatus for superimposing information on a main information signal, said apparatus comprising:

generating means for generating superimposing information composed of plurality of bits;

superimposing means for superimposing said superimposing information on said main information signal by allocating one bit of said superimposing information to one of one block and a plurality of blocks of said main information signal, each said block containing a predetermined amount of data, and generating said main information signal with said superimposing information; and compressing means for converting said information signal with said superimposing information signal from a time-base area signal to a frequency area coefficient by transforming said information signal with said superimposing information for each of said plurality of blocks and for compressing said information signal with said superimposing information and generating a compressed main information signal.

2. A method for superimposing information on a main information signal, comprising the steps of:

generating superimposing information composed of a plurality of bits;

superimposing said superimposing information on said main information signal by allocating one bit of said superimposing information to one of one block and a plurality blocks of said main information, each block containing a predetermined amount of data, and generating said main information signal with said superimposing information; and converting said information signal with said superimposing information from a time-base area signal to a frequency area coefficient by transforming said main information signal with said superimposing signal for each of said plurality of blocks, and compressing said information signal with said superimposing information and generating a compressed main information signal.

3. A method for detecting superimposed information from an information signal, comprising the steps of:

extracting DC components of said information signal; and detecting said superimposed information signal from said DC components of said information signal.

4. A detecting apparatus for detecting superimposed information from an information signal comprising:

extracting means for extracting DC components of said information signal; and detecting means for detecting said superimposed information from said DC components of said information signal.

* * * * *